United States Patent
Ehlers et al.

(10) Patent No.: US 8,681,772 B2
(45) Date of Patent: Mar. 25, 2014

(54) TIMING SYNCHRONIZATION FOR NETWORKS WITH RADIO LINKS

(75) Inventors: Kristian Ehlers, Skovlunde (DK); Brian Branscomb, Hopkinton, MA (US); Thomas Kirkegaard Joergensen, Soeborg (DK)

(73) Assignee: Vitesse Semiconductor Corporation, Camarillo, CA (US)

( * ) Notice: Subject to any disclaimer, the term of this patent is extended or adjusted under 35 U.S.C. 154(b) by 95 days.

(21) Appl. No.: 13/470,092

(22) Filed: May 11, 2012

(65) Prior Publication Data

US 2013/0301634 A1 Nov. 14, 2013

(51) Int. Cl.
*H04J 3/06* (2006.01)
*H04W 4/00* (2009.01)
*H04L 7/00* (2006.01)

(52) U.S. Cl.
USPC ........... 370/350; 370/503; 370/508; 370/516; 370/519; 370/328; 375/356

(58) Field of Classification Search
USPC ......... 370/252, 310, 324, 328, 338, 350, 503, 370/507, 509, 510–522, 354–356, 395.62; 375/354, 356–359
See application file for complete search history.

(56) References Cited

U.S. PATENT DOCUMENTS

| | | | |
|---|---|---|---|
| 6,907,048 B1 | 6/2005 | Treadaway et al. | |
| 7,630,357 B2 * | 12/2009 | Currivan | 370/350 |
| 7,839,897 B2 * | 11/2010 | Radulescu | 370/503 |
| 8,018,972 B2 * | 9/2011 | Roberts et al. | 370/507 |
| 8,233,457 B1 * | 7/2012 | Chen et al. | 370/332 |
| 8,274,999 B2 * | 9/2012 | Shenoi et al. | 370/503 |
| 8,427,963 B2 * | 4/2013 | Zampetti et al. | 370/242 |
| 8,462,821 B1 * | 6/2013 | Sagarwala et al. | 370/508 |
| 2006/0222016 A1 | 10/2006 | Noel et al. | |
| 2008/0069150 A1 * | 3/2008 | Badt et al. | 370/503 |
| 2010/0086091 A1 * | 4/2010 | Park et al. | 375/356 |
| 2010/0329125 A1 * | 12/2010 | Roberts et al. | 370/241.1 |
| 2012/0008953 A1 | 1/2012 | Lu et al. | |
| 2012/0075439 A1 * | 3/2012 | Gong et al. | 348/61 |
| 2012/0229334 A1 * | 9/2012 | Waters et al. | 342/357.42 |
| 2013/0155945 A1 * | 6/2013 | Chen | 370/328 |

FOREIGN PATENT DOCUMENTS

WO  WO 2011-084839 A1  7/2011

OTHER PUBLICATIONS

Marc Cohn et al. "Timing and synchronization for Quasi-Real-Time systems using IEEE 1588v2 over Ethernet", In: ISPCS, 2011 International IEEE Symposium, URL: http://ieeexplore.ieee.org/xpl/login.jsp?tp=&arnumber=6070155, Sep. 12-16, 2011.
International Search Report on related PCT Application No. PCT/US2013/040777 from International Searching Authority (KIPO) dated Aug. 28, 2013.
Written Opinion on related PCT Application No. PCT/US2013/040777 from International Searching Authority (KIPO) dated Aug. 28, 2013.

\* cited by examiner

*Primary Examiner* — Candal Elpenord
(74) *Attorney, Agent, or Firm* — Klein, O'Neill & Singh, LLP

(57) ABSTRACT

Precision Timing Protocol (PTP) related functions for use in packet communications carried in part by a microwave communications link include setting of time of day values across the microwave link and providing transparent clock functions. The PTP functions may be used for synchronizing radio base stations in a cellular network. The transparent clock can bridge Ethernet switches associated with microwave stations providing the microwave communications link.

5 Claims, 10 Drawing Sheets

TIMING SYNCHRONIZATION FOR NETWORKS WITH RADIO LINKS

BACKGROUND OF THE INVENTION

The present invention relates generally to timing synchronization in communication systems and, more particularly, to timing synchronization for communication systems including radio communication links.

It is often advantageous in a communication network for devices in the network to have a common time base. For example, in 3G mobile/cellular communication systems, radio base stations (RBS) are synchronized to within a few microseconds. Precise synchronization facilitates efficient communication such as for allocation of time slots among devices and interference reduction. The electronics industry has developed several standard protocols for use in synchronizing clocks, for example, the Precision Time Protocol (PTP) of IEEE Std. 1588. PTP includes sending timing-related messages between nodes in a communication network. The timing-related messages include, for example, a first node transmitting over a link a time-stamped packet to supply its time base to a second node, and the second node transmitting, over the link, a packet to the first node requesting and thereafter receiving a reply with the time of receipt of the request packet, so that the second node may have information regarding packet time of travel over the link. With these timing related messages the second node may be able to synchronize its local clock to the clock time of the first node, with it often being assumed that packet travel time over the link between the nodes is constant.

Mobile communication networks often use radio links, for example at microwave or millimeter-wave frequencies to provide backhaul from radio base stations to a base station controller or gateway reached through a carrier network. Delivering high-accuracy synchronization using packet-based techniques such as IEEE Std. 1588 (2008), incorporated by reference herein, is especially challenging over radio links. Radio systems have progressed in both capacity and cost. However, many systems may use proprietary communication protocols. The protocols may not include features for establishing common time bases. Moreover, radio systems may have variable delays in propagating information, for example due to changes in bitrate and modulation scheme used for transmission over the wireless radio link. In addition, wireless backhaul equipment may include switches, for example Ethernet switches, and data passing through such switches may encounter variable delays. Thus, timing synchronization of mobile communication systems connected by microwave radio links may be difficult.

BRIEF SUMMARY OF THE INVENTION

In some aspects the invention provides a communication device in data communication with another communication device over a radio link, the communication device comprising: circuitry including packet handling circuitry configured to send and receive packets, to determine an expected time of day (TOD) value for a future time, and to provide the TOD value for transmission to the other communication device; and radio link communication circuitry configured to receive the TOD value and transmit the TOD value over the radio link to the other communication device.

Another aspect of the invention provides a method of performing timing related processing in a packet-based network communications over a microwave communications link, the method comprising: synchronizing clocks of a first packet handling circuitry element and a second packet handling element separated by a microwave communications link, the first packet handling circuitry element being part of a first microwave station and the second packet handling circuitry element being part of a second microwave station, by determining, by a one of the first packet handling circuitry element and the second packet handling circuitry element, an expected time of day (TOD) value for a time in the future at which a periodic signal is to be commonly received or generated by the first packet handling circuitry element and the second packet handling circuitry element, and transmitting the expected TOD value over the microwave communications link to the other of the first packet handling circuitry element or the second packet handling circuitry element; determining a time of arrival of a packet at the first packet handling circuitry element; transmitting the time of arrival of the packet at the first packet handling circuitry element over the microwave communications link to the second packet handling circuitry element; determining a time of departure of the packet from the second packet handling circuitry element; and setting a correction field of the packet to a value based on at least the time of departure of the packet from the second packet handling circuitry element and the time of arrival of the packet at the first packet handling circuitry element.

Another aspect of the invention provides a method of performing timing related processing in a packet-based network communications over a microwave communications link, the method comprising: synchronizing a clock of a first Ethernet switch with a clock of a second Ethernet switch separated by a microwave communications link, the first Ethernet switch being part of a first microwave station and the Ethernet switch being part of a second microwave station; determining a time of arrival of a packet at the first Ethernet switch using a first time of day (TOD) domain; determining a time of departure of the packet from the first Ethernet switch using a time of day (TOD) from a first TOD domain and determining a time of departure of the packet from the first Ethernet switch using a TOD from a second TOD domain; setting a correction field of the packet to a value based on at least the time of departure of the packet from the first Ethernet switch using the TOD from the first TOD domain and the time of arrival of the packet at the first Ethernet switch; and transmitting the packet, including the time of departure of the packet from the first Ethernet switch using the TOD from the second TOD domain, over the microwave communications link to the second Ethernet switch.

Another aspect of the invention provides a method of performing timing related processing in a packet-based network communications over a microwave communications link, the method comprising: receiving, by the first packet handling circuitry element, information regarding a modulation and forward error correction (FEC) scheme used by circuitry performing microwave communications link functions associated with the first packet handling circuitry; receiving, by the first packet handling circuitry, information regarding a modulation and forward error correction (FEC) scheme used by circuitry performing microwave communications link functions associated with the second packet handling circuitry; shaping bandwidth of the information of packets provided to the circuitry performing microwave communications link functions associated with the first packet handling circuitry element to match a data bandwidth of the circuitry performing microwave communications link functions associated with the first packet handling circuitry element based on the modulation and FEC scheme; performing, by the first packet handling circuitry element, at least portions of a precision timing protocol synchronization process with the second packet handling circuitry element, the process additionally including discarding any precision timing protocol packets received within any of a plurality of predefined time periods of a change in the information regarding the modulation and FEC scheme used by circuitry performing microwave communications link functions associated with the second packet handling circuitry.

Another aspect of the invention provides an Ethernet switch, comprising: a plurality of ingress ports and egress ports; a switch fabric configurable to route packets between ingress ports and egress ports; and circuitry configured to determine a first time of arrival for a first packet at a one of the ingress ports in a first time of day (TOD) domain, and to determine a first time of departure for the first packet at a one of the egress ports in the first TOD domain and to determine a second time of departure for the first packet at the one of the egress ports in a second TOD domain.

Another aspect of the invention provides an Ethernet switch, the Ethernet switch coupled to microwave communications circuitry, the Ethernet switch comprising: a switch fabric coupling input ports and output ports, at least one of the input ports and at least one of the output ports coupled to the microwave communications circuitry; a shaper to shape bandwidth of data passed from the switch fabric to the microwave communications circuitry; and processing circuitry configured to receive information regarding a transmission modulation and forward error correction (FEC) scheme in use by the microwave communications circuitry for transmitted information over a microwave communications link and to provide information to the shaper as to a bandwidth to be used in shaping bandwidth, the processing circuitry being further configured to receive a reception modulation and FEC scheme in use by the microwave communications circuitry for received information over the microwave communications link and to command dropping of a precision timing protocol packet received within a predefined period of time of a change in the reception modulation and FEC scheme.

These and other aspects of the invention are more fully comprehended on review of this disclosure.

DETAILED DESCRIPTION

Figure 1:
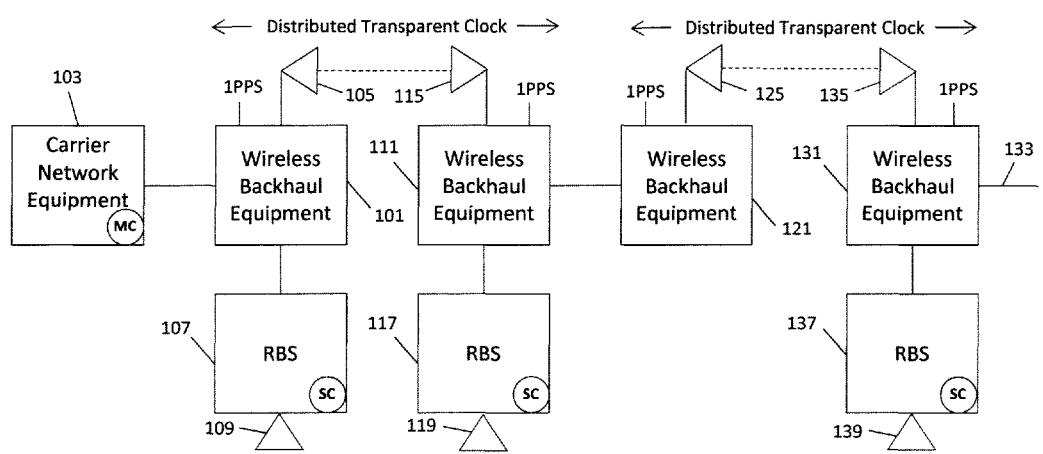
FIG. 1 is a diagram of a communication system including radio communication links in accordance with aspects of the invention.

FIG. 1 is a diagram of an example communication system including radio communication links in accordance with aspects of the invention. The communication system generally includes radio base stations for providing communications with mobile subscribers, for example subscribers using cellular communications devices, with the radio base stations coupled to a carrier network by communications links that include radio communication links. In the example communication system of FIG. 1, radio base stations 107, 117 with respective antennas 109, 119 are in communication with the subscribers. Wireless backhaul equipment 101, 111 passes information from the radio base stations to and from, for example, carrier network equipment 103. The carrier network equipment may be part of a wired carrier network used for carrying subscriber communications, and in that regard the carrier network equipment may be viewed as a link to or a node on a wired carrier network.

As shown in FIG. 1, the communication system includes a first wireless backhaul station 101 in communication with a second wireless backhaul station 111 over a radio link, for example a microwave link. The first station is, for example, co-located with and directly cabled to a mobile/cellular radio base station (RBS) 107, and the second station is, for example, co-located with and directly cabled to another RBS 117. The first station 101 includes an antenna 105 that sends and receives digitally coded microwave signals to and from another antenna 115 included at the second station 111. The first station is connected to the carrier network equipment 103 by a wired link, and the second station is coupled to the carrier network equipment via the radio link to the first station 101.

The portions of the wireless backhaul stations performing the microwave communication functions may not utilize a time base in common with other network components, with the microwave communicating portions of the backhaul stations for example utilizing their own time base. It is generally preferable, however, that the RBS 107 and 117, separated by the microwave link, have synchronized clocks.

The RBS 107 and the RBS 117 each include a local clock, synchronized to a clock of the carrier network equipment 103. The RBS 107 may synchronize its local clock to the clock of the carrier network equipment using signaling received by way of the first station, with the signaling for example conforming to IEEE 1588v2. For example, if communications between the carrier network equipment and RBS 107 flow through an Ethernet switch of the backhaul station 101, that portion of the backhaul station may perform as a transparent clock. As indicated in FIG. 1, the carrier network equipment serves as a master clock and the RBS 107 is a slave clock, although the node serving the master clock will generally be determined in accordance with a best master clock algorithm.

The RBS 117 also synchronizes its local clock to the clock of the carrier network equipment, for example in accordance with IEEE 1588v2. Communications between the first backhaul station and the second backhaul station, to which the RBS 117 is coupled, flow through the portions of the backhaul stations performing microwave communication functions. The signaling for synchronization of the local clock of RBS 117, therefore, is provided over the microwave link between the backhaul stations.

The local clock time of day (TOD) for the first station may be set, for example, using a precision timing protocol (PTP) flow that is provided by network elements, such as the carrier network equipment 103, coupled to the first station. In overview the TOD for the second station may be set by the first station transmitting a TOD value to the second station, with the TOD value sent to the second station being a value that will be the TOD of the first station, and to which the second station may set its local clock, at the next pulse or transition of a periodic signal commonly received or synchronously generated by both stations.

In some embodiments the commonly received or synchronously generated signal is a pulse-per-second (1 PPS) signal. For example, as shown in FIG. 1 the first station 101 and the second station 111 each also receive a pulse-per-second (1 PPS) signal. The 1 PPS signals arrive at, or are generated by, the stations at substantially the same time instances or with a substantially fixed and known time offset. In one embodiment, the 1 PPS signals pulse at a rate of one pulse per second, although other rates may also be used. The 1 PPS signals may be, for example, provided over the microwave link or a by a separate mechanism such as from global positioning system devices.

In some embodiments each of the microwave stations include packet handling circuitry, for example an Ethernet switch. Each Ethernet switch may, for example, receive packets input to its corresponding station by way of wired connections and provide those packets for communication over wired or wireless connections. For example, the packets may be provided to an RBS coupled to the station by a wired connection, or the packets may be provided to other station elements for further processing and microwave transmission to the other station. Packets received by the other station would be provided to that station's Ethernet switch for further communication over further wired or wireless connections.

In various embodiments the TOD value is generated by an Ethernet switch of one station, for example the first station, and received by the other station, for example the second station, with the second station using the 1 PPS signal, for example generated by a portion of the station involved with microwave communications functions, to determine the time at which the TOD applies.

In some embodiments, the Ethernet switches may operate so as to form a transparent clock from a wired ingress port of one Ethernet switch, across the microwave link, and to a wired egress port of the other Ethernet switch. The transparent clock may be, for example, a PTP transparent clock or a transparent clock in accordance with IEEE Standard 1588 (2008). As the transparent clock bridges both the Ethernet switches and the microwave communicating link, the transparent clock may be considered a distributed transparent clock.

For example, it may be assumed that the first station is transmitting information of the packets over a microwave link to the second station, although the converse may also apply. In such a scenario the Ethernet switch of the first station may set a time stamp to a time of arrival of a packet at an ingress part of the Ethernet switch, with the packet, including the time stamp, thereafter forwarded by the first station to the second station. The time stamp, for example, may be placed in a reserved field of a packet header, or otherwise placed in the packet. The Ethernet switch of the second station forwards the packet over the wired connection, with the Ethernet switch of the second station setting a time stamp field of the packet using the second station's time, which is synchronized with the first station's time, for example using the TOD value and the 1 PPS signal. In some embodiments the time stamp field is a correction field of the packet, with the value of the correction field being based on, and in many cases the difference between, an expected time of egress of the packet from the second station or the Ethernet switch of the second station and the time of arrival time stamp set by the first station.

The embodiment of FIG. 1 additionally includes a third wireless backhaul station 121 in communication with a fourth wireless backhaul station 131, with the fourth station co-located with yet another RBS 137 which communicates with mobile subscribers by way of antenna 139. The third station 121 is in wired communication with the second station 111, and the second and third stations may be located in proximity to one another, and the fourth station may also communicate with another component via wired connections 133.

In operation, the third and fourth stations may synchronize their local clocks as discussed with respect to the first and second stations, with the second station, for purposes of clock synchronization, performing the function of providing a clock time that was performed by the carrier network equipment with respect to a clock time for the first station, and the third station providing a TOD value for use by the fourth station. Similarly, the third and fourth stations may also include Ethernet switches, and third and fourth stations may set time stamps and correction fields as discussed with respect to the first and second stations.

Figure 2:
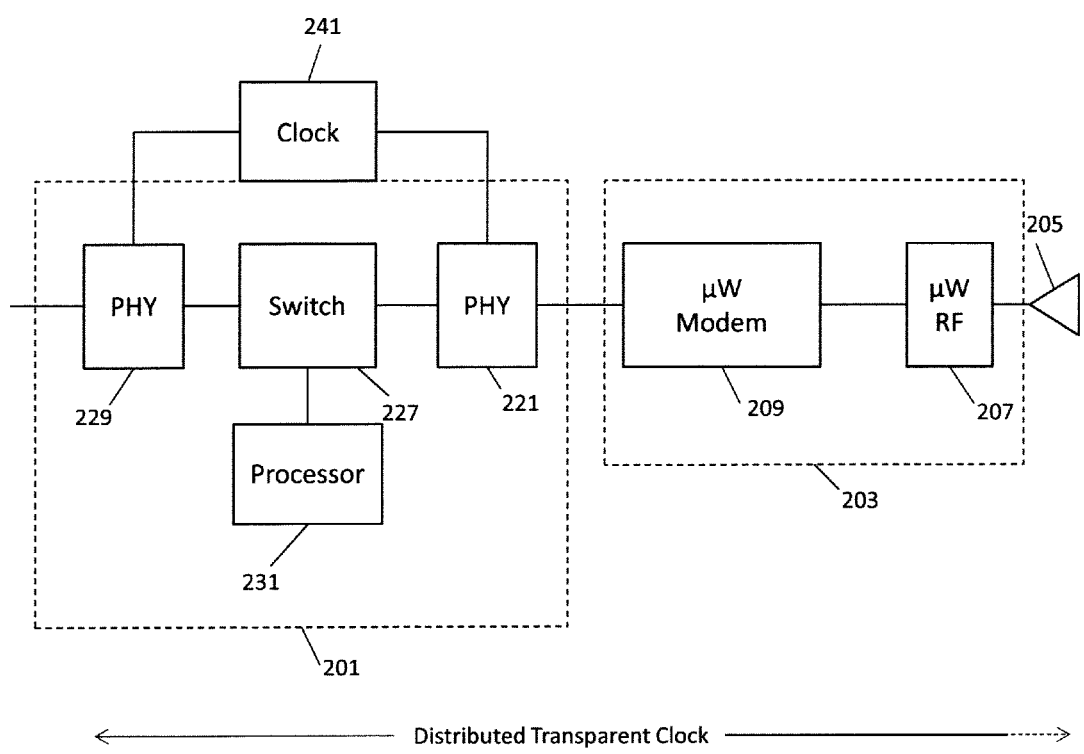
FIG. 2 is a block diagram of a communication device in accordance with aspects of the invention.

FIG. 2 is a block diagram of a communication device in accordance with aspects of the invention. The communication device may be used, for example, as, at least in part, the master, transparent clock, or slave station of the communication system of FIG. 1. The communication device receives and transmits microwave signals via an antenna 205. The antenna 205 is coupled to a microwave radio system 203, which includes a microwave radio frequency block 207 and a microwave modem block 209. The microwave radio frequency block 207 may include, for example, a power amplifier in the transmit path and a low noise amplifier in the receive path. The microwave radio frequency block 207 also includes an upconverter in the transmit path and a downconverter in the receive path. In some embodiments, the microwave radio frequency block 207 is configured as an outdoor unit (ODU). The microwave radio frequency block 207 is coupled to the microwave modem block 209, which may contain intermediate frequency (IF) and/or baseband processing functions. The microwave modem block 209 supplies a signal for transmission to the microwave radio frequency block 207, and the microwave radio frequency block 207 supplies the received signal to the microwave modem block 209. The microwave modem block 209 converts the received modulated signal to digital form, including, for example, demodulating and decoding the signal. The microwave modem block 209 also converts an unmodulated digital signal for transmission from digital form, including, for example, coding and modulating the signal.

The digital signals of the microwave radio system are coupled to an Ethernet switch 201. The Ethernet switch generally includes physical layer devices (PHYs) 221, 229 for sending and receiving signals to and from the microwave radio system and to and from a wired interface, a switch 227 for routing signals, and, in various embodiments, a processor 231 or other logic elements for control of device operations. The device may also include a clock 241, although the clock may be external to the device in some embodiments and as shown in FIG. 2. Similarly in various embodiments some or all of the PHYs, switch, and/or processor may be implemented as separate devices, and may include varying additional components. The PHYs, which may be Ethernet PHYs, convert digital signals to packets of information, and vice versa. The first PHY 221 communicates with the microwave radio system, and the second PHY 229 communicates to and from other communication devices over a wired network (which may include one or more RBS and microwave radio systems). Between the PHYs, the packets are communicated through the switch block 227, which routes the packets. In the embodiment illustrated in FIG. 2, the communication device includes two physical layer devices; however, in other embodiments, there may be a greater number of physical layer devices with the packets routed by the switch block between the physical layer devices, for example, accordingly to addresses contained in the packets. Some packets, in addition or instead, may be routed to and from the processor 231, which may be programmable.

The local clock 241 provides a time base for the device. The local clock 241 may operate, for example, as a master clock or as a slave clock, depending on, for example, an outcome of a best master clock negotiation. In some embodiments, the physical layer devices process timing related messages that they receive. For example, a physical layer device may parse packets to determine what type, if any, timing related messages are in the packets. Depending on the type of message, the physical layer device may modify the packet to signal the time at which the packet is received on transmitted.

The communication device may signal the value of its local clock by the communication device transmitting the value via the antenna 205. For example, the programmable processor 231 in the communication device may create a control message packet signaling the value the local clock will have at a predetermined time in the future. In more detail, the local clock 241 may be timing locked to a 1 PPS signal with the value signaled in the control message packet being the value the local clock 241 will have at the next pulse of the 1 PPS signal. In some embodiments, the programmable processor 231 may create the packet with the control message packet with the first physical layer device 221 placing the value in the packet.

Alternatively, the communication device may receive, via the antenna 205, a signal indicating the value to which the local clock should be set at the predetermined time in the future. For example, the programmable processor 231 may receive, decode, and execute a control message packet signaling the value for the local clock at the predetermined time in the future. In more detail, the local clock 241 may be timing locked to a 1 PPS signal with the value signaled in the control message packet being the value for the local clock 241 at the next pulse of the 1 PPS signal. In some embodiments, the packet with the control message packet may be processed at least partially by the first physical layer device 221.

Figure 3:
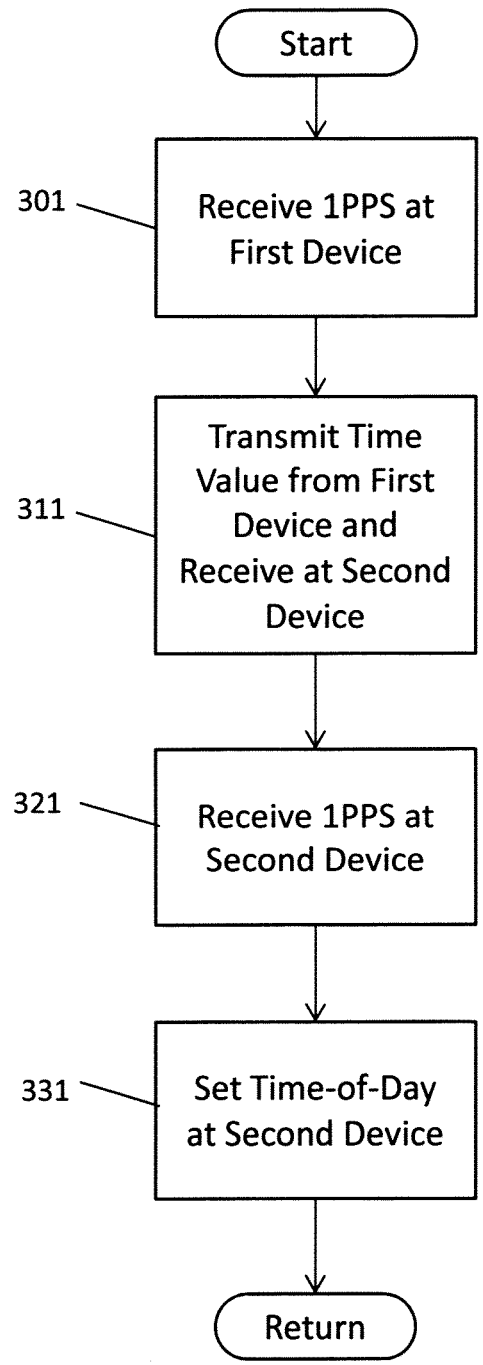
FIG. 3 is a flowchart of a synchronization process in accordance with aspects of the invention.

FIG. 3 is a flowchart of a synchronization process in accordance with aspects of the invention. The process provides for timing synchronization from a first device to a second device. The synchronization process may be performed in the microwave communication system of FIG. 1. Additionally, part of the process may be performed by the communication device of FIG. 2. Various parts of the process may be performed by specific circuitry of the communication device, such as a physical layer device, or by a programmable processor according to program instructions.

In block 301, the first device receives a pulse of a 1 PPS signal. In response, or based upon the occurrence of some other predefined event or events, the first device determines the value its local clock will have at the next pulse of the 1 PPS signal. For example, when the 1 PPS signal pulses once per second, the process adds one second to the current value of the local clock. In block 311, the process transmits the value the first device's local clock will have at the next pulse of the 1 PPS signal to the second device. In some embodiments, the process transmits the value in an Ethernet packet containing a control message. In the second device, the process receives, decodes, and extracts the clock value from the message.

In block 321, the process receives a pulse of a 1 PPS signal at the second device. Although the 1 PPS signals at the first and second devices are synchronized, due at least to delay in communicating the time value in block 311, the pulse of the 1 PPS signal at the second device is the "next pulse" of the 1 PPS signal for which the clock value was determined by the master device in block 301. In block 331, the process sets the local clock in the slave device to the clock value received by the second device in block 311.

In some systems, the synchronization process is performed at regular intervals. In other systems, the second device transmits messages signaling the value of its local clock to the first device. The first device may then initiate the synchronization process when the value of the second device's local clock does not match the local clock of the first device.

Figure 4:
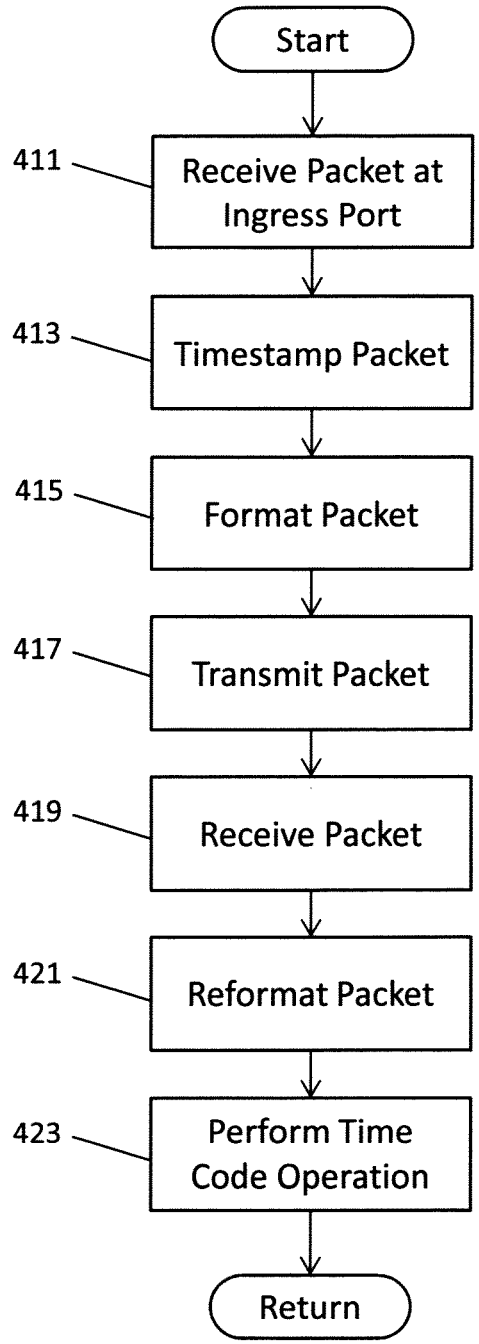
FIG. 4 is a flowchart of a communication process in accordance with aspects of the invention.

FIG. 4 is a flow diagram of a process for processing packets including time protocol related information that are communicated over a microwave link. The process may be performed, for example, by the first and second stations of FIG. 1, each of which for example may include the communication device of FIG. 2.

In block 411 a precision time protocol packet is received at an ingress port of an Ethernet switch. In block 413 the Ethernet switch timestamps the packet with a time of arrival of the packet at an ingress port of the switch. In various embodiments the Ethernet switch may timestamp the packet by writing a time of arrival in a timestamp field of the packet, or by writing a time of arrival in some other field of the packet, or by writing some other time in accordance with precision time protocols using the time of arrival. The timestamp may be determined, in some embodiments, at some time after arrival of the packet, with the Ethernet switch accounting for processing delays within the Ethernet switch from the time of arrival to the time of determination of time of arrival. In some embodiments the time stamp may be determined by a PHY within the Ethernet switch, and in some embodiments the time stamp may be determined by logic circuitry, including a processor, of the Ethernet switch.

In block 415 the process formats the packet into a non-precision time protocol packet, although in some embodiments operations of block 415 are skipped or optional. The information of the time of arrival is retained in information of the packet. Formatting the packet into a non-precision time protocol packet may be useful, for example, if the packet is to be transmitted, received, or otherwise processed by network elements not configured or expecting to process precision time protocol packets. In block 417 the process transmits the packet to another network node, for example by way of a microwave modem and RF unit, which in various embodiments may be a microwave outdoor unit (ODU). In some embodiments, however, the microwave ODU may only include the RF unit, with the microwave modem being part of an indoor unit (IDU), which may include the Ethernet switch, or the Ethernet switch, the microwave modem, and the RF unit may all be part of an ODU.

In block 419 the packet is received by the other node. The other node may receive the packet, for example, using a microwave RF unit and microwave modem. In block 421 the process optionally, (for example if operations of block 415 have been or were to have been performed), reformats the packet into a precision time protocol packet, and the reformatting may be performed, for example, by an Ethernet switch of the other node. In block 423 the process performs a time code operation on the packet using an expected egress time of the packet from the other node or, more particularly, from an egress port of the Ethernet switch. The time code operation may be performed by logic circuitry, including a processor, of the Ethernet switch, or by a PHY of or associated with the Ethernet switch. The egress time may be determined prior to egress of the packet from the Ethernet switch or PHY, with the Ethernet switch or PHY accounting for expected delays between the time of determination and the expected time of egress.

In some embodiments the time code operation is to set a correction field of the packet to a value indicating the time period from ingress of the packet into the Ethernet switch of the transmitting node to egress of the packet from the Ethernet switch of the receiving node. The value, therefore, indicates a time period, which may vary from packet to packet, of processing by both Ethernet switches and processing and transmission by both microwave modems, in effect making the combined Ethernet and microwave processing systems a transparent clock for precision time protocol purposes.

Figure 5:
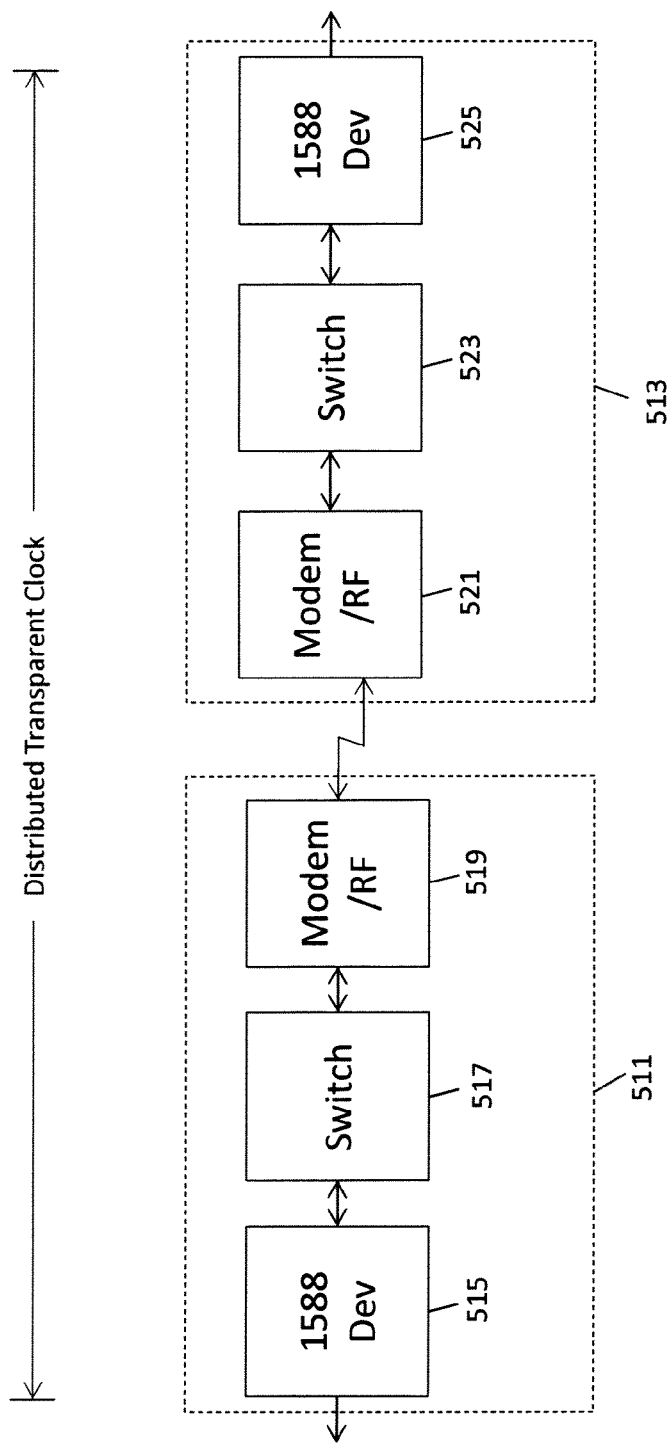
FIG. 5 is a block diagram of a further communication system in accordance with aspects of the invention.

FIG. 5 is a block diagram of a further communication system in accordance with aspects of the invention. In FIG. 5 a first microwave station 511 is in communication with a second microwave station 513 via a microwave communications link, with each of the microwave stations also in communication with other network nodes via wired communications link, including fiber optic lines.

The microwave stations each have a local clock synchronized to the other, for example by way of the method discussed with respect to FIG. 3.

The first microwave station receives precision time protocol packets over a wired link, with the packets received by a precision time protocol capable PHY 515, for example an IEEE 1588v2 compliant PHY. The PHY determines a value for a time of ingress of a packet into the PHY, using the local clock of the station, and inserts the value into a time field of the packet. The value may be determined at some point in time after the packet is received by the PHY, with the PHY accounting for time spent processing the packet between time of reception and time of determining the value. The packet is passed to a switch unit 517 of the first microwave station. The switch formats the packet into a time unaware format, retaining the time value within the packet, and routes the packet. A modem and RF unit 519 of the first microwave station receives the formatted packet, processes the packet for microwave transmission, and transmits information of the formatted packet over a microwave link to the second microwave station.

A modem and RF unit 521 of the second microwave station receives information of the formatted packet and performs microwave reception processing, for example amplification of the received signal, downconversion to baseband, and forward error correction processing. The formatted packet is received by a switch unit 523 of the second microwave station, which reformats the packet into a time aware format, for example a precision time protocol in accordance with the IEEE 1588 (2008) standard, (1588 v2) and routes the reformatted packet to a PHY 525 of the second microwave station. The PHY 525, like the PHY 515, is a precision time protocol capable PHY, for example an IEEE 1588v2 compliant PHY. The PHY determines a value for a time of egress of the packet from the PHY, using a local clock of the station. In some embodiments the time of egress is written into a field of the packet. In several embodiments, however, the PHY determines a correction value for the packet, with the correction value being, for example, the time of egress from the PHY 525 minus the time of ingress into the PHY 515. The correction value may be written into a correction field of the packet, directly in some embodiments but more commonly in additive manner to whatever value may already be present in the correction field. Similar to the PHY 515, the PHY 525 may determine the time of egress of the packet prior to actual egress of the packet, with the PHY accounting for processing time between time of determination of egress time and actual egress time.

Figure 6:
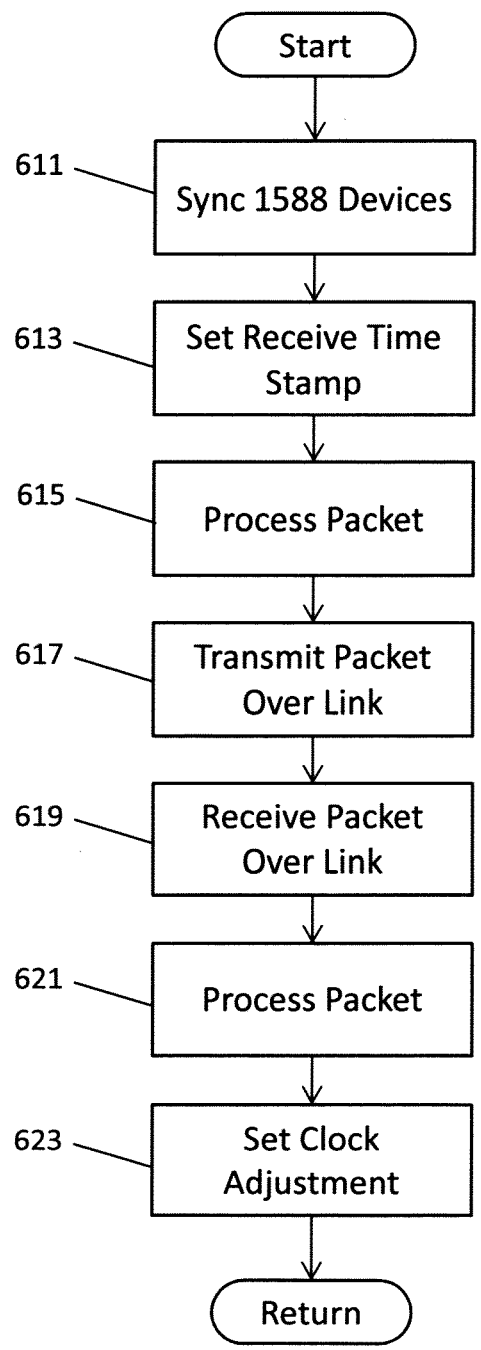
FIG. 6 is a flowchart of a communication process in accordance with aspects of the invention.

FIG. 6 is a flow chart of a communication process in accordance with aspects of the invention. The process may be performed, for example, by the microwave stations of FIG. 5, and portions of the process may be separately performed by the first microwave station of FIG. 5 and second microwave station of FIG. 5.

In block 611 the process synchronizes time protocol capable devices of two microwave stations. The time protocol capable devices may be physical layer devices, and the physical layer devices (PHYs) may be at ingress and/or egress points for electrical communications for the stations. In some embodiments the physical layer devices are compliant with 1588v2 protocols. The devices may be synchronized, for example through use of the method discussed with respect to FIG. 3 or elsewhere herein.

In block 613 the process determines and writes a time stamp value into a received packet, with the time stamp value preferably indicating a time of arrival of the packet at a first microwave station. The time stamp value may be determined by a PHY of the first microwave station. In block 615 the packet is processed by the first microwave station, for example by reformatting the packet into another format. For example, the received packet may be in a time aware protocol, for example a precision time protocol or a 1588v2 protocol, and the packet may be formatted into a time unaware protocol. In some embodiments the packet is formatted into another protocol through an encapsulation scheme, or by splitting the packet into two or more packets, which may include information from other packets as well, or by adding additional control signaling information, or placing control signaling information into a payload of the packet. In block 617 the process transmits information of the packet over a microwave link. In various embodiments the operation of block 617 include adding forward error correction information to information of the packet, modulating the packet for microwave transmission, upconverting to microwave frequencies, and amplifying the resultant signal for transmission through a microwave antenna.

In block 619 the process receives the transmitted information, with the reception occurring for example by a second microwave station. In receiving the transmitted information the process will generally amplify a received signal, down-convert the signal to baseband, recover digital information of the downcoverted signal, and possibly correct the digitial information using the forward error correction information. In block 621 the process processes the digital information, for example by reformatting the information into a time aware protocol and/or routing the information to a physical layer device. In block 623 the process determines and writes a clock adjustment value into a field of the packet. The clock adjustment value may be determined by the PHY of the second microwave station that was synchronized with the PHY of the first microwave station. The clock adjustment value may be, for example, the difference between an expected egress time of the packet from the PHY of the second microwave station and the timestamp value determined by the PHY of the first microwave station, and in some embodiments additionally whatever value may already be present in the field of the packet into which the clock adjustment value is to be written.

Figure 7:
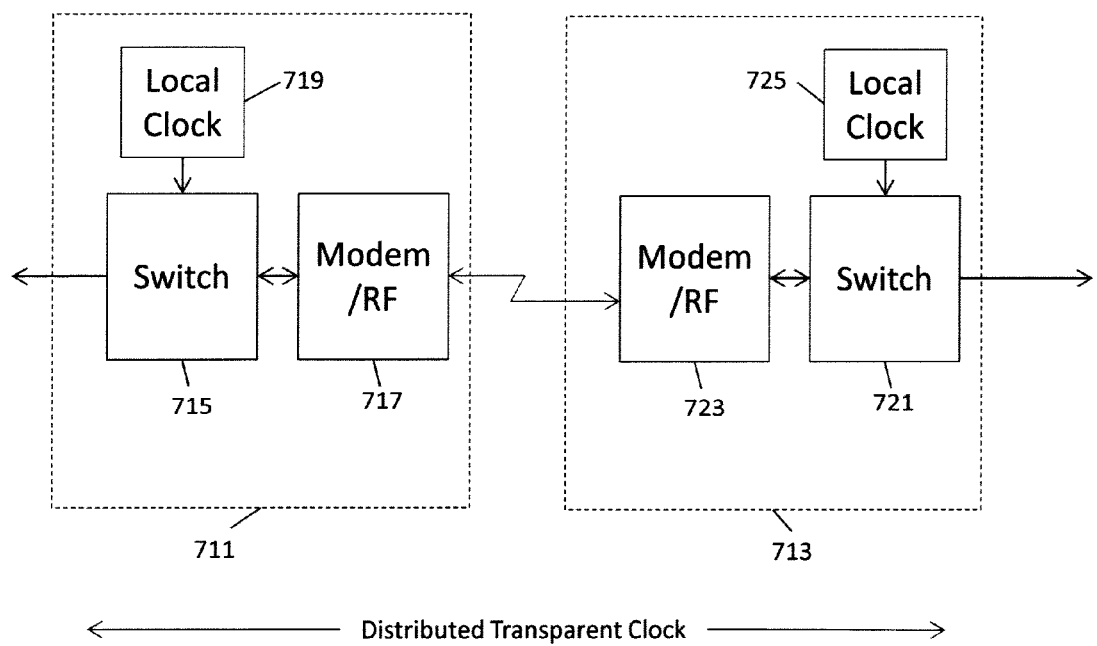
FIG. 7 is a block diagram of a further communication system in accordance with aspects of the invention.

FIG. 7 is a block diagram of a further system in accordance with aspects of the invention. The system includes a first microwave station 711 in communication with a second microwave station 713 over a microwave link. The first microwave station includes a switch 715 in data communication with a microwave modem and RF unit 717. The switch unit may be for example an Ethernet switch, and the switch unit includes a processor. A local clock 719 provides time information to the switch. The microwave modem and RF unit, which generally includes baseband processing functions and RF functions, communicates over a microwave airwave link with the second microwave station. The second microwave station similarly includes a switch 721, a microwave modem 723, and a local clock 725.

Processors of the switch units synchronize their clocks, with in some embodiments one of the switch units serving as a master clock and one of the switch units serving as a slave clock, with the choice of master clock and slave clock determined for example using a best master clock algorithm. Synchronization may occur through a variety of manners, as for example discussed herein.

In some embodiments the switch units provide data to the microwave modems at a rate such that the microwave modems may operate with a constant delay of data through the microwave modems. In such embodiments, for example, the switch units may include shapers that may adjust bandwidth of data provided to the modems, with the shapers setting the bandwidth such that the microwave modems have a fixed delay in data passage through the modems. In some embodiments bandwidth of the microwave modems is dependent on transmission modulation and forward error correction (FEC) schemes utilized by the microwave modems, which may depend on a variety of factors including atmospheric conditions, interfering transmissions, and other factors. In such embodiments the switches receive information from their respective modems as to the modulation and FEC schemes, and adjust shaper bandwidth accordingly, for example to match operating bandwidth of the microwave modems.

With known delays through the microwave modems, in some embodiments processors of the switches may synchronize their clocks through use of transmission of a time stamped packet from a first of the switch units to a second of the switch units, transmission of a request for a time of receipt packet from the second switch unit to the first switch unit, and a reply transmission from the first switch unit. As it is possible that the modems may change their modulation and FEC schemes, preferably synchronization packets that bridge such a change are discarded without being used, with synchronization re-performed after any change in modem modulation and FEC scheme changes.

Figure 9:
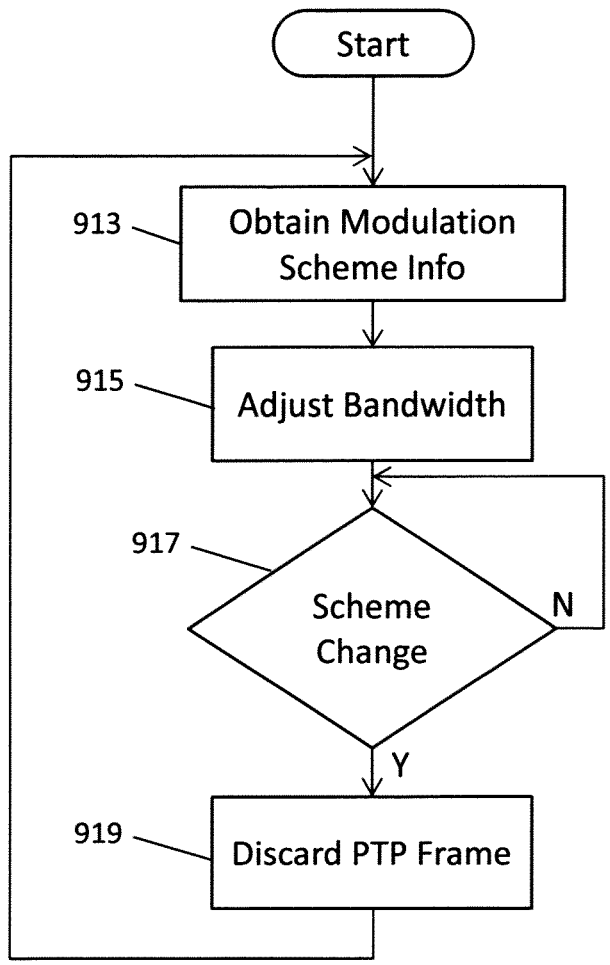
FIG. 9 is a flowchart of a communication process in accordance with aspects of the invention.

FIG. 9 is a flow diagram of a communication process in accordance with aspects of the invention. The process may be performed, for example, by a switch unit of the microwave stations of FIG. 7.

In block 913 the switch unit receives modulation and FEC scheme information from a microwave modem associated with the switch. Preferably the modulation and FEC scheme information is provided both for data to be transmitted by the modem and for data received by the modem, in the event that different schemes are used depending on the direction of communication. The switch unit may receive the information, in various embodiments, at periodic intervals, for example through a polling process or periodic signaling by the modem, or by the modem sending the switch unit signals upon scheme changes.

In block 915 the switch unit adjusts bandwidth of data provided to the modem for transmission. The bandwidth is adjusted such that the modem receives data at a bandwidth no greater than the modem's maximum data bandwidth for the current modulation and FEC scheme. In some embodiments the bandwidth is adjusted such that the modem receives data at a bandwidth equal to the modem's maximum data bandwidth for the current modulation and FEC scheme.

In block 917 the switch unit determines if the modem has changed its modulation and/or FEC scheme. If not, the switch unit continues to provide the modem data at the rate determined in block 915. If the modulation and/or FEC scheme has changed, however, the switch unit in block 919 discards any precision time protocol packets or frames whose latency through the microwave link might be different than expected due to the change in modulation and/or FEC scheme. The process thereafter returns to block 913 to re-obtain modem modulation and FEC scheme information, and continue the process.

Figure 8:
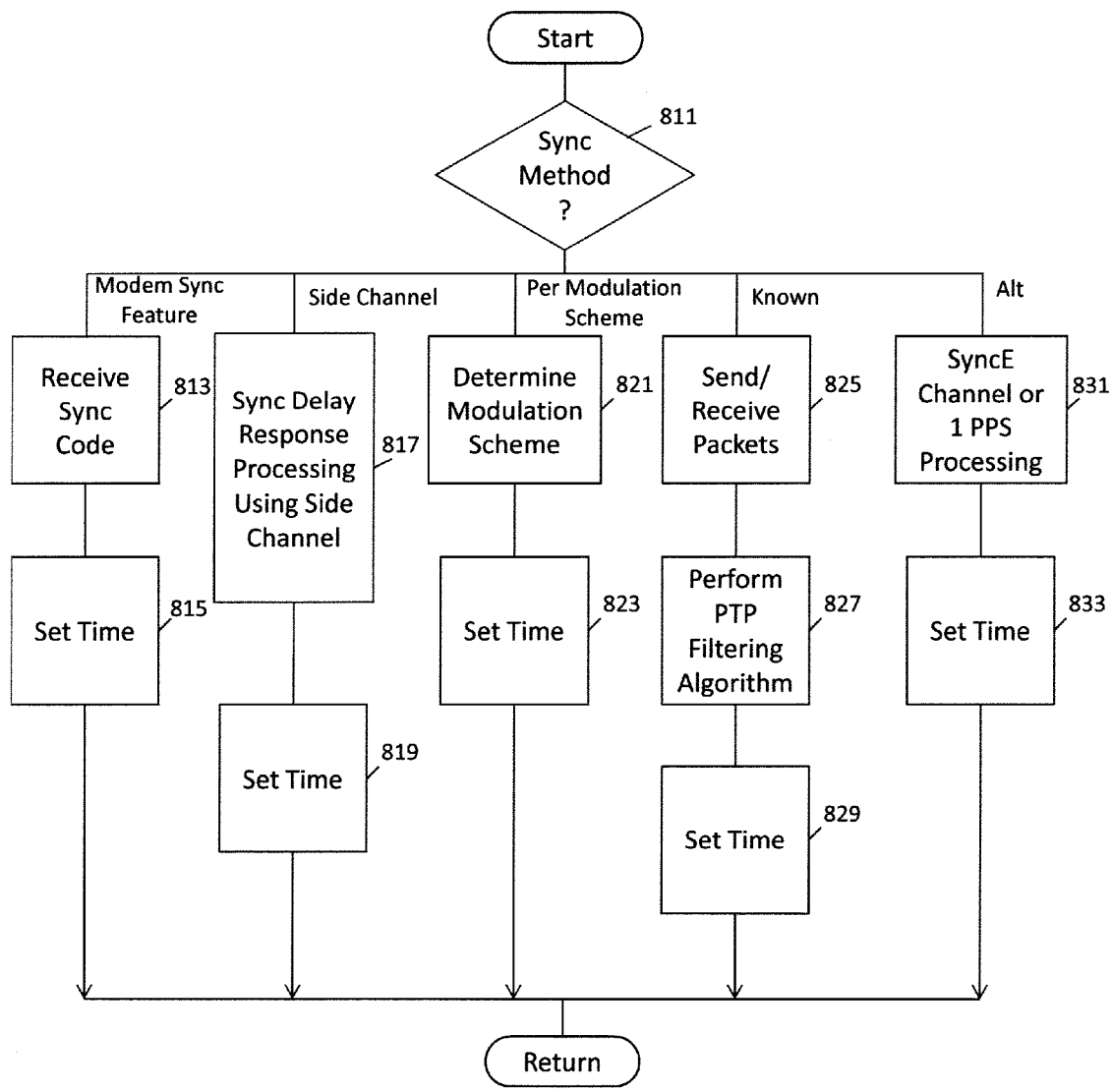
FIG. 8 is a flowchart of further synchronization processes in accordance with aspects of the invention.

FIG. 8 is a flow diagram of a synchronization process for two devices separated by a microwave link in accordance with aspects of the invention. The process may be performed, for example, by devices in the microwave stations of FIG. 1, or the stations or processors of the switches of FIG. 7.

In block 811 the process determines a synchronization method. The methods include microwave modem synchronization, side channel synchronization, per modulation scheme synchronization, known latency skew synchronization, or alternative synchronization. In various embodiments determination of the synchronization method is determined at system installation, by other components, or based upon system information provided by the microwave modem.

In some embodiments microwave modems provide a synchronization mechanism to synchronize microwave modems across a microwave link. In such embodiments the process may continue to block 813, with the switch unit receiving a synchronization pulse and associated time from its corresponding modem. The process in block 815 sets the local clock time to the value provided by the modem, and thereafter returns.

In some embodiments the microwave link includes a low bandwidth side channel, for example for transmission of microwave modem control signals, with the side channel having a known latency. In such embodiments the process may continue to block 817, with the switch unit sending and receiving synchronization and delay response messages in order to determine synchronization information. The process in block 819 sets the local clock to the value determined as a result of the messages sent and received in block 817, and thereafter returns.

In some embodiments the microwave modems may have, or be able to be forced to have, fixed and known latency for transmission and reception for each of its modulation and FEC schemes. In such embodiments the process may continue to block 821. In block 821 the switch unit determines the modulation and FEC scheme in use by the modem, preferably for both transmission and reception, provides the modem data at a rate no greater than a maximum allowed data rate of the modem, and transmits and receives synchronization and delay response messages in order to determine synchronization information. The process in block 821 sets the local clock to the value determined as a result of the messages sent and received in block 823, and thereafter returns.

In some embodiments the microwave modems may have a symmetrical or known latency skew. In such embodiments the process may continue to block 825, with the switch unit sending and receiving synchronization packets, with the switch in block 827 performing a PTP filtering algorithm to determine a clock time. In block 829 the process sets the local clock to the value determined by the PTP filtering algorithm, and thereafter returns.

In some embodiments an alternative synchronization is used. In such embodiments the process may continue to block 831, with the switch unit utilizing a synchronous Ethernet (syncE) channel, if supported by the modems, or 1 PPS processing to determine a clock time. In block 833 the process sets the local clock time to the time determined in block 831, and thereafter returns.

Figure 10:
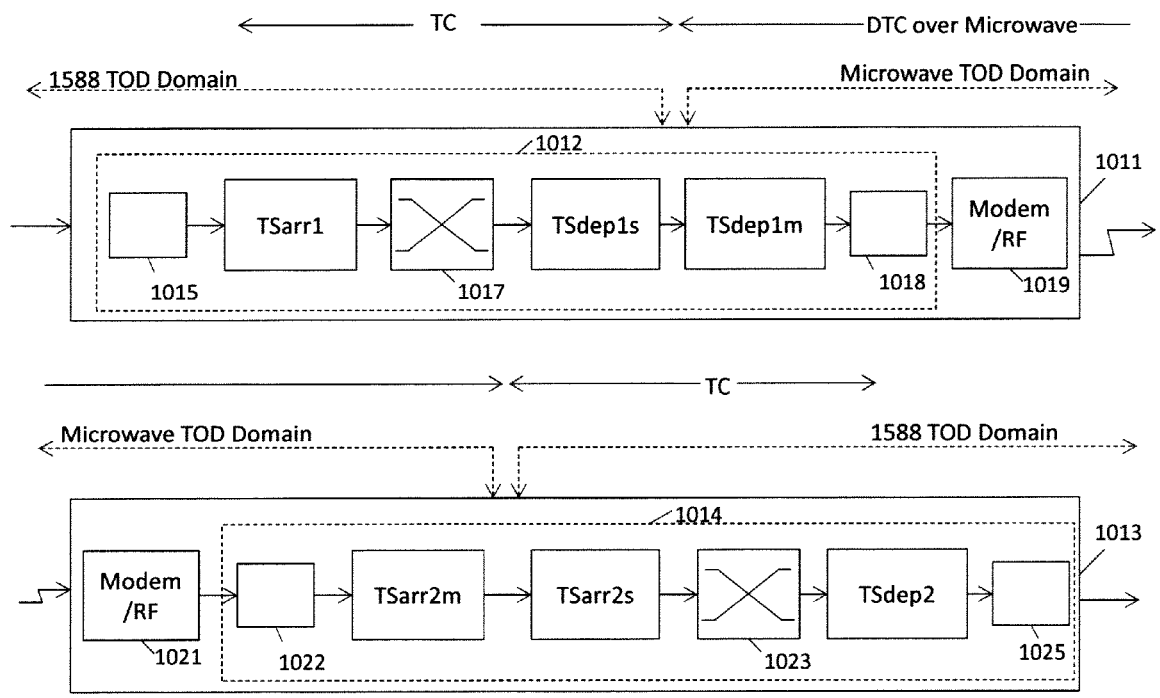
FIG. 10 is a semi-block diagram, semi-process flow of a further synchronization system and process in accordance with aspects of the invention.

FIG. 10 is a semi-block diagram, semi-process diagram of a further system and process in accordance with aspects of the invention. In FIG. 10, a first microwave station 1011 is in communication with a second microwave station 1013. The first microwave station includes a microwave modem/RF unit 1019 for providing microwave communications, and a switch unit 1012 including a switch 1017 for routing packets to and from a port 1018 coupled to the microwave modem/RF unit and various other ports, of which only one, port 1015, is illustrated in FIG. 10. The switch generally operates under control of a processor or processing circuitry (not shown in FIG. 10). In some embodiments the microwave modem/RF unit and the switch unit are located in a single housing as, for example, an ODU, while in some embodiments the switch unit and the microwave modem/RF unit are separately housed.

Similarly, the second microwave station 1013 includes a microwave modem/RF unit 1021 for providing microwave communications, and a switch unit 1014 including a switch 1023 for routing packets to and from a port 1022 coupled to the microwave modem/RF unit and various other ports, of which, as with the first microwave station, only a single port 1025 is illustrated in FIG. 10. As with the first station, in some embodiments the microwave modem/RF unit and the switch unit are located in a single housing as, for example, an ODU, while in some embodiments the switch unit and the microwave modem/RF unit are separately housed.

In operation, the switch unit of the first microwave station may receive a precision time protocol packet at port 1015, with the switch unit determining a time of arrival $TSarr1$ of the packet at the switch unit, with the switch unit utilizing its TOD in determining $TSarr1$. The switch unit writes the time of arrival $TSarr1$ into a field of the packet. The time of arrival $TSarr1$ is, in some embodiments, written to reserved bytes of the PTP packet. The switch unit routes the packet through its switch, in this case towards port 1018 coupled to the microwave modem/RF unit, although the packet may be routed to other ports, for example a port with a wired connection to an RBS associated with the station.

Prior to sending the packet to the microwave modem/RF unit, or to, for example, an RBS coupled by a wired connection to the first microwave station, the switch unit determines a time or times of departure for the packet from the switch unit. The times of departure include a time of departure $TSdep1s$ utilizing the switch unit's TOD and a time of departure $TSdep1m$ utilizing a TOD of the microwave modem/RF unit, which the microwave modem/RF unit provides to the switch unit. In some embodiments the time of departure $TSdep1m$ need not be determined, for example if the packet is not to be routed to the microwave modem/RF unit. The switch unit, in some embodiments, sets a correction field of the packet to a value equal to the current value of the correction field plus the quantity $TSdep1s$ minus $TSarr1$, or $CF=CF+(TSdep1s-TSarr1)$, with $(TSdep1s-TSarr1)$ representing in various embodiments a switch latency time for the packet.

In several embodiments the microwave modem/RF unit may have a different TOD than the switch unit. For example, in various embodiments the microwave modem/RF units of both the first station and the second station may share a common TOD. Accordingly, the switch unit also, in some embodiments, writes the value of $TSdep1m$ to a reserved field of the packet.

The microwave modem/RF unit of the first microwave station performs microwave transmission operations on the packet information, including transmitting the packet to the second microwave station. The microwave modem/RF unit of the second microwave station receives the packet information and performs associated microwave reception operations, and provides the packet to port 1022 of the switch unit 1014. The switch unit 1014 determines times of arrival to the switch unit for the packet, including a time of arrival $TSarr2m$ utilizing the microwave modem/RF unit's TOD and a time of arrival $TSarr2s$ utilizing the switch unit's TOD.

The switch unit updates the correction field of the packet by setting the correction field of the packet to a value equal to the current value of the correction field plus the quantity $TSarr2m$ minus $TSdep1m$, or $CF=CF+(TSarr2m-TSdep1m)$, with $(TSarr2m-TSdep1m)$ representing in various embodiments a microwave system communications latency time. The switch unit also writes the value of $TSarr2s$ into the packet, for example in reserved bytes of the packet.

The switch unit 1014 routes the packet through its switch, for example towards port 1025, from which the packet will depart from the switch unit. Prior to the packet departing from the switch unit, the switch unit determines an expected time of departure $TSdep2$ for the packet. In some embodiments the switch unit sets the correction field of the packet to a value equal to the current value of the correction field plus the quantity $TSdep2$ minus $TSarr2s$, or $CF=CF+(TSdep2-TSarr2s)$, with $(TSdep2-TSarr2s)$ representing in various embodiments a switch latency time for the packet. The correction field therefore includes, upon departure from the switch unit, information as to both switch unit latency time, for both switches, and microwave system communications latency time. Each of these components of latency separately determined, with the latencies determined in different time domains for the switch and the microwave system communication. In operation, therefore, a transparent clock is provided, which may be considered a concatenated distributed transparent clock, as the transparent clock crosses time of day domains and is a sum of multiple calculated latencies.

Accordingly, aspects of the invention provide for synchronization of devices separated by a microwave link, and implementation of a distributed transparent clock across a microwave link. Although the invention has been discussed with respect to varying embodiments, it should be recognized that the invention includes the novel and non-obvious claims supported by this disclosure.

What is claimed is:

1. A method of performing timing related processing in a packet-based network communications over a microwave communications link, the method comprising:
synchronizing clocks of a first packet handling circuitry element and a second packet handling circuitry element separated by a microwave communications link, the first packet handling circuitry element being part of a first microwave station and the second packet handling circuitry element being part of a second microwave station, by determining, by a one of the first packet handling circuitry element and the second packet handling circuitry element, an expected time of day (TOD) value for a time in the future at which a periodic signal is to be commonly received or generated by the first packet handling circuitry element and the second packet handling circuitry element, and transmitting the expected TOD value over the microwave communications link to the other of the first packet handling circuitry element or the second packet handling circuitry element;

determining a time of arrival of a packet at the first packet handling circuitry element;

transmitting the time of arrival of the packet at the first packet handling circuitry element over the microwave communications link to the second packet handling circuitry element;

determining a time of departure of the packet from the second packet handling circuitry element; and setting a correction field of the packet to a value based on at least the time of departure of the packet from the second packet handling circuitry element and the time of arrival of the packet at the first packet handling circuitry element.

2. The method of claim 1, further comprising setting, by the other of the first packet handling circuitry or the second packet handling circuitry, a local TOD to the expected TOD value upon receipt or generation of the periodic signal.

3. The method of claim 1, wherein setting the correction field of the packet to the value based on at least the time of departure of the packet from the second packet handling circuitry element and the time of arrival of the packet at the first packet handling circuitry element comprises setting the correction field of the packet to a value equal to a value of the correction field plus the difference between the time of departure of the packet from the second packet handling circuitry element and the time of arrival of the packet at the first packet handling circuitry element.

4. The method of claim 1, wherein the first packet handling circuitry and the second packet handling circuitry each include a switch for routing packets.

5. The method of claim 1, wherein the first packet handling circuitry comprises a first Ethernet switch and the second packet handling circuitry comprises a second Ethernet switch.

* * * * *